United States Patent
Zhang

(10) Patent No.: US 12,153,538 B2
(45) Date of Patent: Nov. 26, 2024

(54) I2C DEADLOCK AND RECOVERY METHOD AND APPARATUS

(71) Applicant: INSPUR SUZHOU INTELLIGENT TECHNOLOGY CO., LTD., Jiangsu (CN)

(72) Inventor: Zhibei Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 79 days.

(21) Appl. No.: 18/016,496

(22) PCT Filed: Feb. 25, 2021

(86) PCT No.: PCT/CN2021/077804
§ 371 (c)(1),
(2) Date: Jan. 17, 2023

(87) PCT Pub. No.: WO2022/012052
PCT Pub. Date: Jan. 20, 2022

(65) Prior Publication Data
US 2023/0281150 A1    Sep. 7, 2023

(30) Foreign Application Priority Data
Jul. 17, 2020 (CN) .......................... 202010693810.5

(51) Int. Cl.
G06F 13/14    (2006.01)
G06F 13/42    (2006.01)

(52) U.S. Cl.
CPC .. *G06F 13/4282* (2013.01); *G06F 2213/0016* (2013.01)

(58) Field of Classification Search
None
See application file for complete search history.

(56) References Cited

U.S. PATENT DOCUMENTS 10,461,851 B1 *   10/2019   Zeng ................... H04B 10/503
2007/0230958 A1 * 10/2007   Jiang .................. H04B 10/0793
                                                                  398/72

(Continued)

FOREIGN PATENT DOCUMENTS

CN    103412531 A    11/2013
CN    107562668 A    1/2018

(Continued)

OTHER PUBLICATIONS

Corresponding International Patent Application No. PCT/CN2021/077804, International Search Report, Date Mailed May 14, 2021.

(Continued)

*Primary Examiner* — Henry Tsai
*Assistant Examiner* — Dean Phan
(74) *Attorney, Agent, or Firm* — Cooper Legal Group, LLC

(57) ABSTRACT

An Inter-Integrated Circuit (I2C) deadlock and recovery method and apparatus include the following steps: providing an optical module reading unit and an optical module isolation unit in a CPU of a switch; configuring the optical module reading unit to periodically scan the states of each optical module in the switch, reading contents of in-place optical modules, determining whether there is an optical module in which a content reading failure occurs but the state of which is in place, and if there is, determining that there is a faulty optical module; and configuring the optical module isolation unit to isolate all the optical modules of the switch, resetting an I2C bus, searching for and blocking the faulty optical module, deactivating the isolation of normal optical modules in the switch after the faulty optical module is blocked off, and notifying a BMC before and after the isolation of the optical modules.

17 Claims, 3 Drawing Sheets

(56) References Cited

U.S. PATENT DOCUMENTS

2017/0147453 A1* 5/2017 Huang ................ G06F 11/0706
2018/0203779 A1* 7/2018 Huang ................ G06F 11/3048

FOREIGN PATENT DOCUMENTS

| CN | 108073540 A | 5/2018 |
| CN | 208126373 U | 11/2018 |
| CN | 109309528 A | 2/2019 |
| CN | 110417464 A | 11/2019 |
| CN | 111858448 A | 10/2020 |

OTHER PUBLICATIONS

Corresponding International Patent Application No. PCT/CN2021/077804, Written Opinion Date Mailed May 14, 2021.
Corresponding Chinese Patent Application No. 202010693810.5, Notification to Grant, dated Oct. 10, 2022.

* cited by examiner

I2C DEADLOCK AND RECOVERY METHOD AND APPARATUS

This application claims priority to Chinese Patent Application No. 202010693810.5, filed on Jul. 17, 2020 in China National Intellectual Property Administration and entitled "I2C Deadlock and Recovery Method and Apparatus", which is hereby incorporated by reference in its entirety.

FIELD

The present disclosure pertains the technical field of Inter-Integrated Circuit (I2C) self-checking for optical modules, in particular to an I2C deadlock and recovery method and apparatus.

BACKGROUND

EEPROM, the abbreviation of Electrically-Erasable Programmable React-Only Memory, is an electronically-erasable programmable read-only memory.

DOM, the abbreviation of Digital Optical monitoring, is digital optical monitoring.

BMC, the abbreviation of Baseboard Management Controller, is a baseboard management controller.

With the rapid development of the network world, there are increasing network devices on the Internet, and network cables are relatively richer and more diversified. Most of the network cables access information through Inter-Integrated Circuit (I2C) devices. When a cable fails, an I2C bus will be deadlocked, and at this time, any device on the I2C bus will become inaccessible. How to quickly identify an I2C bus deadlock and quickly recover a bus to a normal state is an urgent problem to be solved.

An I2C bus and a Serial Peripheral Interface (SPI) are also of a master-slave architecture, which is different from a point-to-point or point-to-multipoint structure of the SPI, but involves a bus on which a plurality of master devices (maters) and a plurality of slave devices (slaves) are allowed. There are many reasons for the occurrence of an I2C deadlock, but simply speaking, both a master and a slave enter a deadlock state of waiting for each other. In another case, a slave device is damaged, which will continuously pull Serial Data (SDA) down, causing an I2C bus deadlock. For example, an optical module is commonly used in a switch in a network. When the optical module, as a slave device on an I2C bus, is damaged, an I2C bus deadlock also occurs, and any device on the I2C bus will become inaccessible. Moreover, the occurrence and timely discovery of an I2C deadlock in the case of damage to the optical module need to be excluded from other reasons one by one.

One way in the prior art is to add an I2C bus recovery program to an I2C master device. This way has a limitation, because most of the I2C modules of the slave device are implemented by built-in hardware circuits, and software cannot directly control an Serial Clock (SCL) signal to simulate and generate a required clock pulse. In the prior art, another way is to import commercial hardware and serially connect an I2C buffer with a deadlock recovery function to an I2C. This way has a disadvantage of an increase in extra hardware cost, and if the hardware has operational problems, error removal is not easy.

This is the deficiency of the prior art. Therefore, for the above defects in the prior art, it is very necessary to provide an I2C deadlock and recovery method and apparatus.

SUMMARY

For the above defects in the prior art that an Inter-Integrated Circuit (I2C) deadlock caused by damage to an optical module cannot be discovered in a timely manner and existing technologies for I2C deadlock recovery all need to consume additional hardware circuits, the present disclosure provides an I2C deadlock and recovery method and apparatus to solve the technical problems.

In a first aspect, the present disclosure provides an I2C deadlock and recovery method, including the following steps:

S1, providing an optical module reading unit and an optical module isolation unit in a central processing unit (CPU) of a switch;

S2, configuring the optical module reading unit to periodically scan states of each optical module in the switch, reading contents of in-place optical modules, and determining whether there is a faulty optical module in which a content reading failure occurs but a state of which is in place; and S3, configuring the optical module isolation unit to isolate all optical modules of the switch, resetting an I2C bus, searching for and blocking the faulty optical module, deactivating an isolation of normal optical modules in the switch after the faulty optical module is blocked off, and notifying a Baseboard Management Controller (BMC) before and after the isolation of the optical modules.

Further, substeps of step S2 are as follows:

S21, configuring the optical module reading unit to periodically scan the states of each optical module in the switch, and obtaining the in-place optical modules;

S22, configuring the optical module reading unit to read the contents of the in-place optical modules in sequence, and determining whether a content reading failure occurs;

if so, entering step S23;

otherwise, returning to step S21; and

S23, configuring the optical module reading unit to determine an existence of a faulty optical module, and entering step S3. The optical module, the state of which is in place but in which a content reading failure occurs, is a faulty optical module. The faulty optical module may cause an I2C deadlock.

Further, the optical module reading unit is configured to read the contents of the in-place optical modules in an Electrically-Erasable Programmable Read-Only Memory (EEPROM) and a Digital Optical monitoring (DOM).

Further, substeps of step S3 are as follows:

S31, configuring the optical module isolation unit to mark all the optical modules as unreadable in an optical module driver to isolate all the optical modules;

S32, configuring the optical module isolation unit to notify the BMC that there is an abnormal optical module, and resetting an I2C data selector;

S33, configuring the optical module isolation unit to iteratively read all ports of the switch, locating a reading failure port, and determining and recording damage of an optical module corresponding to the port; and S34, configuring the optical module isolation unit to mark a faulty port number in the optical module driver, deactivating the isolation of the normal optical modules, and synchronously notifying the BMC. When the fault of an optical module is found, all the optical modules are isolated immediately. After the corresponding port of the faulty optical module is found, the faulty optical module is blocked, and then the isolation of the normal optical modules is deactivated to prevent an I2C deadlock caused by the fault of the optical module. Meanwhile, the I2C is reset by resetting the I2C data selector to prevent the existing deadlock of the I2C bus.

Further, in step S1, an optical module scanning in-place unit is further provided in the CPU of the switch;

The following step is further included after step S3:

S4, configuring the optical module scanning in-place unit to regularly detect whether the faulty optical module is recovered to normal, and deactivating the blocking of the faulty optical module after the faulty optical module is recovered to normal.

Further, substeps of step S4 are as follows:

S41, configuring the optical module scanning in-place unit to regularly detect whether the faulty optical module is recovered to normal;

if so, entering step S42;

otherwise, returning to step S41; and

S42, configuring the optical module scanning in-place unit to update, in the optical module driver, the port number corresponding to the optical module that is recovered to normal, and synchronizing the update to the BMC. After the user replaces the faulty optical module, the blocking of the corresponding port is automatically deactivated through automatic scanning, and the work of the replaced optical module is recovered.

In a second aspect, the present disclosure provides an I2C deadlock and recovery apparatus, including:

an optical module function unit providing module for providing an optical module reading unit, an optical module isolation unit, and an optical module scanning in-place unit in a CPU of a switch;

a faulty optical module obtaining module for configuring the optical module reading unit to periodically scan states of each optical module in the switch, reading contents of in-place optical modules, and determining whether there is a faulty optical module in which a content reading failure occurs but a state of which is in place;

a faulty optical module blocking module for configuring the optical module isolation unit to isolate all optical modules of the switch, resetting an I2C bus, searching for and blocking the faulty optical module, deactivating an isolation of normal optical modules in the switch after the faulty optical module is blocked off, and notifying a BMC before and after the isolation of the optical modules; and a blocking deactivating module for configuring the optical module scanning in-place unit to regularly detect whether the faulty optical module is recovered to normal, and deactivating the blocking of the faulty optical module after the faulty optical module is recovered to normal.

Further, the faulty optical module obtaining module includes:

an in-place state optical module obtaining sub-module for configuring the optical module reading unit to periodically scan the states of each optical module in the switch, and obtaining the in-place optical modules;

an optical module content reading sub-module for configuring the optical module reading unit to read the contents of the in-place optical modules in sequence, and determining whether a content reading failure occurs; and a faulty optical module determination sub-module for configuring the optical module reading unit to determine an existence of a faulty optical module when an in-place optical module content reading failure occurs.

Further, the faulty optical module blocking module includes:

an optical module isolation sub-module for configuring the optical module isolation unit to mark all the optical modules as unreadable in an optical module driver to isolate all the optical modules;

an I2C resetting sub-module for configuring the optical module isolation unit to notify the BMC that there is an abnormal optical module, and resetting an I2C data selector;

a damaged optical module port searching sub-module for configuring the optical module isolation unit to iteratively read all ports of the switch, determining whether the reading succeeds, and when there is a reading failure port, determining and recording damage of the optical module corresponding to the port; and a faulty optical module blocking sub-module for configuring the optical module isolation unit to mark a faulty port number in the optical module driver, deactivating the isolation of the normal optical modules, and synchronously notifying the BMC.

Further, the blocking deactivating module includes:

a faulty optical module replacement detection sub-module for configuring the optical module scanning in-place unit to regularly detect whether the faulty optical module is recovered to normal; and a faulty optical module blocking deactivating sub-module for, after the faulty optical module is recovered to normal, configuring the optical module scanning in-place unit to update, in the optical module driver, the port number corresponding to the optical module that is recovered to normal, and synchronizing the update to the BMC.

The present disclosure has the following beneficial effects:

By means of the I2C deadlock and recovery method and apparatus provided by the present disclosure, an I2C deadlock caused by damage to an optical module is effectively detected, and an I2C bus is reset in a timely manner; moreover, a damaged faulty optical module is blocked off, and the blocking of the optical module after fault recovery can be automatically deactivated.

In addition, the present disclosure has reliable design principle and simple structure, and has a very wide application prospect.

Thus, compared with the prior art, the present disclosure has outstanding substantive characteristics and remarkable progress, and the beneficial effects of its implementation are also obvious.

BRIEF DESCRIPTION OF THE DRAWINGS

In order to describe the technical solutions in the embodiments of the present disclosure or in the prior art more clearly, drawings required to be used in the illustration of the embodiments or the prior art will be briefly introduced below. Apparently, those ordinarily skilled in the art also can obtain other drawings according to the provided drawings without creative work.

In the figures, 1—optical module function unit providing module; 2—faulty optical module obtaining module; 2.1—in-place state optical module obtaining sub-module; 2.2—optical module content reading sub-module; 2.3—faulty optical mode determination sub-module; 3—faulty optical module blocking module; 3.1—optical module isolation sub-module; 3.2—Inter-Integrated Circuit (I2C) resetting sub-module; 3.3—damaged optical module port searching sub-module; 3.4—faulty optical module blocking sub-module; 4—blocking deactivating module; 4.1—faulty optical module replacement detection sub-module; 4.2—faulty optical module blocking deactivating sub-module.

DETAILED DESCRIPTION

To make those skilled in the art better understand the technical solutions in the present disclosure, the technical solutions in the embodiments of the present disclosure will be clearly and completely described with reference to the accompanying drawings in the embodiments of the present disclosure. Apparently, the described embodiments are only some of, not all of the embodiments of the present disclosure. Based on the embodiments of the present disclosure, all other embodiments obtained by those ordinarily skilled in the art without creative work shall fall within the protection scope of the present disclosure.

Figure 1:
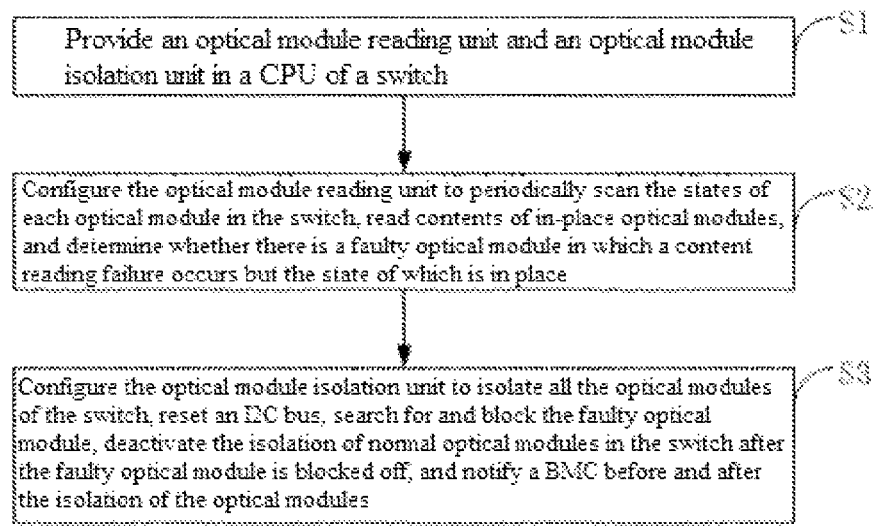
FIG. 1 is a first schematic flowchart of a method of the present disclosure.

In an embodiment:

As shown in FIG. 1, the present disclosure provides an Inter-Integrated Circuit (I2C) deadlock and recovery method, including the following steps:

S1. An optical module reading unit and an optical module isolation unit are provided in a central processing unit (CPU) of a switch;

S2. The optical module reading unit is configured to periodically scan the states of each optical module in the switch, contents of in-place optical modules are read, and whether there is a faulty optical module in which a content reading failure occurs but the state of which is in place is determined; and S3. The optical module isolation unit is configured to isolate all the optical modules of the switch, an I2C bus is reset, the faulty optical module is searched and blocked, the isolation of normal optical modules in the switch is deactivated after the faulty optical module is blocked off, and a Baseboard Management Controller (BMC) is notified before and after the isolation of the optical modules.

Figure 2:
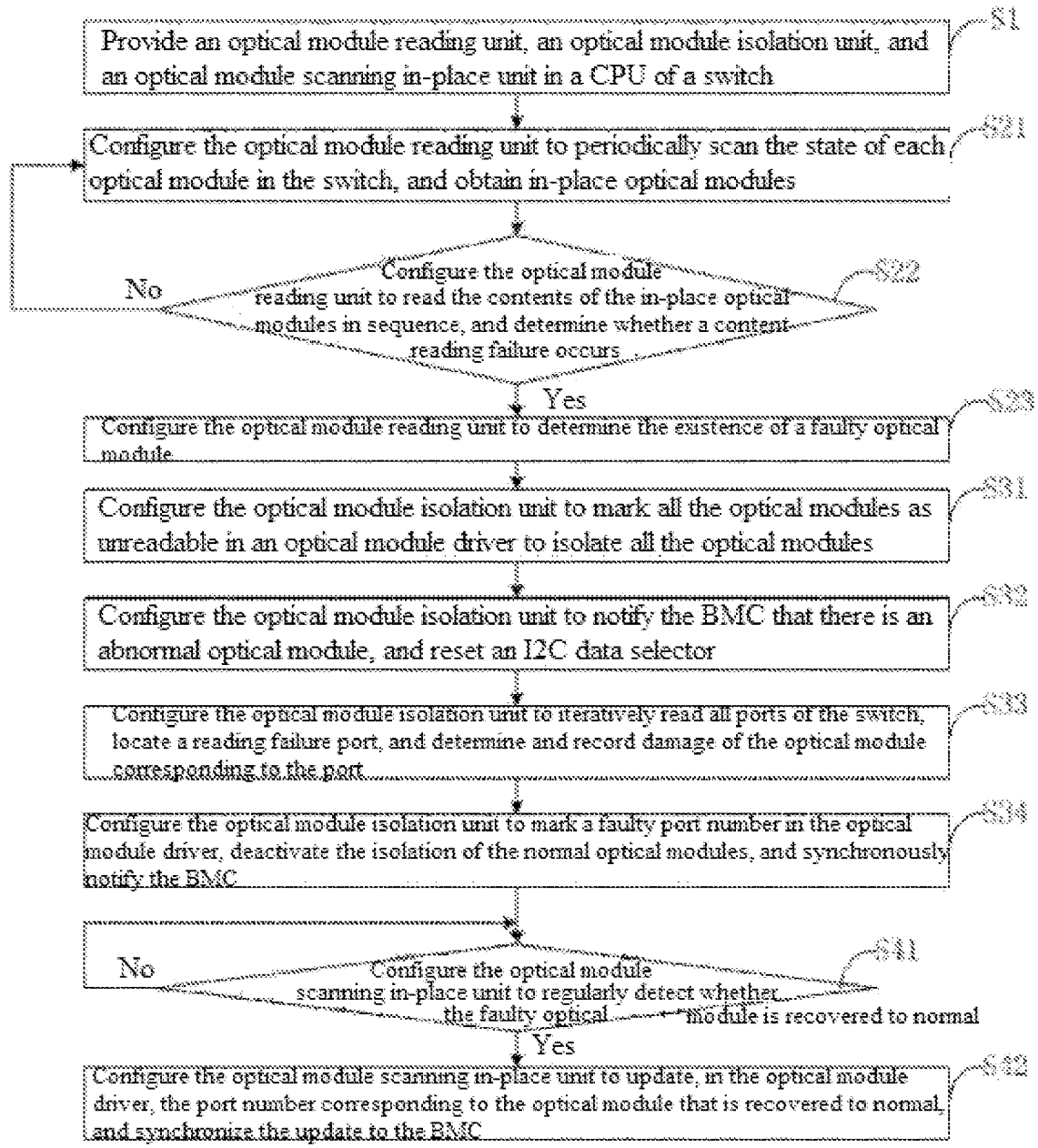
FIG. 2 is a second schematic flowchart of a method of the present disclosure.

In an embodiment:

As shown in FIG. 2, the present disclosure provides an I2C deadlock and recovery method, including the following steps:

S1. An optical module reading unit, an optical module isolation unit, and an optical module scanning in-place unit are provided in a CPU of a switch;

S2. The optical module reading unit is configured to periodically scan the states of each optical module in the switch, contents of in-place optical modules are read, and whether there is a faulty optical module in which a content reading failure occurs but the state of which is in place is determined; the steps are as follows:

S21. The optical module reading unit is configured to periodically scan the states of each optical module in the switch, and in-place optical modules are obtained;

S22. The optical module reading unit is configured to read the contents of the in-place optical modules in sequence, and whether a content reading failure occurs is determined;

If so, step S23 is entered;

Otherwise, step S21 is returned to;

S23. The optical module reading unit is configured to determine the existence of a faulty optical module, and step S3 is entered;

S3. The optical module isolation unit is configured to isolate all the optical modules of the switch, an I2C bus is reset, the faulty optical module is searched and blocked, the isolation of normal optical modules in the switch is deactivated after the faulty optical module is blocked off, and a BMC is notified before and after the isolation of the optical modules; steps are as follows:

S31. The optical module isolation unit is configured to mark all the optical modules as unreadable in an optical module driver to isolate all the optical modules;

S32. The optical module isolation unit is configured to notify the BMC that there is an abnormal optical module, and an I2C data selector is reset;

S33. The optical module isolation unit is configured to iteratively read all ports of the switch, a reading failure port is located, and damage of the optical module corresponding to the port is determined and recorded;

S34. The optical module isolation unit is configured to mark a faulty port number in the optical module driver, the isolation of the normal optical modules is deactivated, and the BMC is synchronously notified;

S4. The optical module scanning in-place unit is configured to regularly detect whether the faulty optical module is recovered to normal, and the blocking of the faulty optical module is deactivated after the faulty optical module is recovered to normal; steps are as follows:

S41. The optical module scanning in-place unit is configured to regularly detect whether the faulty optical module is recovered to normal;

If so, step S42 is entered;

Otherwise, step S41 is returned to;

S42. The optical module scanning in-place unit is configured to update, in the optical module driver, the port number corresponding to the optical module that is recovered to normal, and the update is synchronized to the BMC.

Figure 3:
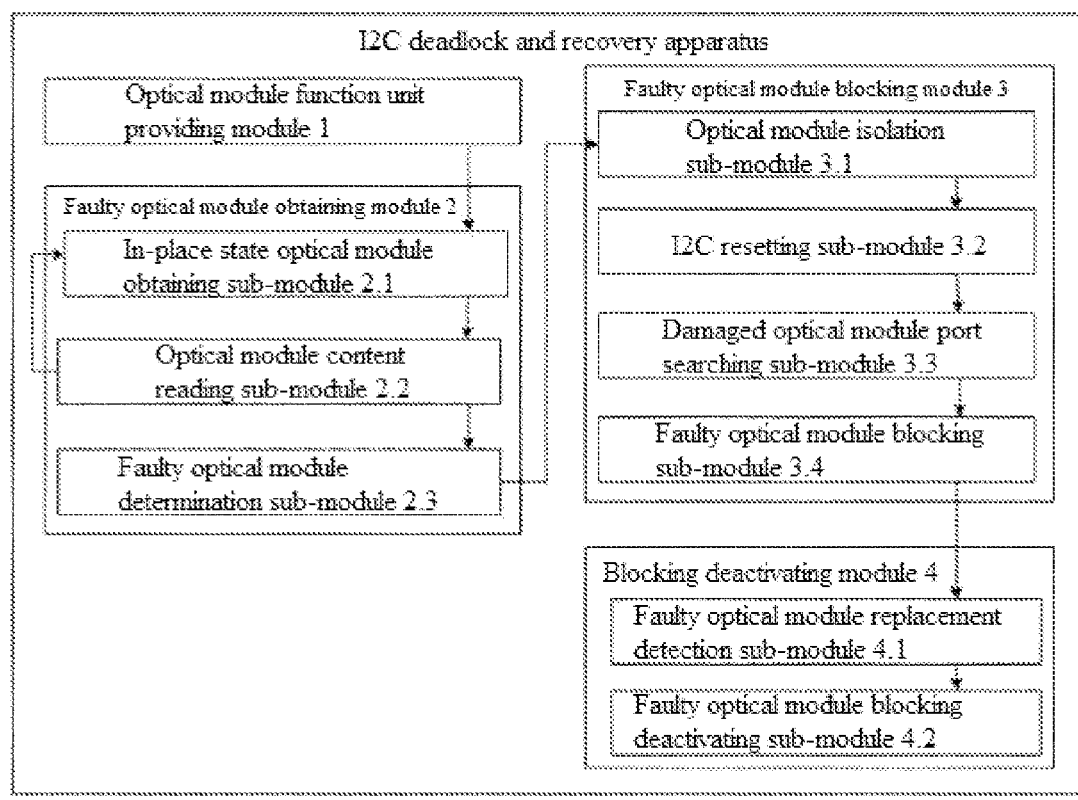
FIG. 3 is a schematic diagram of a system of the present disclosure.

In an embodiment:

As shown in FIG. 3, the present disclosure provides an I2C deadlock and recovery apparatus, including:

an optical module function unit providing module 1 for providing an optical module reading unit, an optical module isolation unit, and an optical module scanning in-place unit in a CPU of a switch;

a faulty optical module obtaining module 2 for configuring the optical module reading unit to periodically scan the states of each optical module in the switch, reading contents of in-place optical modules, and determining whether there is a faulty optical module in which a content reading failure occurs but the state of which is in place, where the faulty optical module obtaining module 2 includes:

an in-place state optical module obtaining sub-module 2.1 for configuring the optical module reading unit to periodically scan the states of each optical module in the switch, and obtaining in-place optical modules, an optical module content reading sub-module 2.2 for configuring the optical module reading unit to read the contents of the in-place optical modules in sequence, and determining whether a content reading failure occurs, and a faulty optical module determination sub-module 2.3 for configuring the optical module reading unit to determine the existence of a faulty optical module when an in-place optical module content reading failure occurs;

a faulty optical module blocking module 3 for configuring the optical module isolation unit to isolate all the optical modules of the switch, resetting an I2C bus, searching for and blocking the faulty optical module, deactivating the isolation of normal optical modules in the switch after the faulty optical module is blocked off, and notifying a BMC before and after the isolation of the optical modules, where the faulty optical module blocking module 3 includes:

an optical module isolation sub-module 3.1 for configuring the optical module isolation unit to mark all the optical modules as unreadable in an optical module driver to isolate all the optical modules, an I2C resetting sub-module 3.2 for configuring the optical module isolation unit to notify the BMC that there is an abnormal optical module, and resetting an I2C data selector, a damaged optical module port searching sub-module 3.3 for configuring the optical module isolation unit to iteratively read all ports of the switch, determining whether the reading succeeds, and when there is a reading failure port, determining and recording damage of the optical module corresponding to the port, and a faulty optical module blocking sub-module 3.4 for configuring the optical module isolation unit to mark a faulty port number in the optical module driver, deactivating the isolation of the normal optical modules, and synchronously notifying the BMC; and a blocking deactivating module 4 for configuring the optical module scanning in-place unit to regularly detect whether the faulty optical module is recovered to normal, and deactivating the blocking of the faulty optical module after the faulty optical module is recovered to normal, where the blocking deactivating module 4 includes:

a faulty optical module replacement detection sub-module 4.1 for configuring the optical module scanning in-place unit to regularly detect whether the faulty optical module is recovered to normal, and a faulty optical module blocking deactivating sub-module 4.2 for, after the faulty optical module is recovered to normal, configuring the optical module scanning in-place unit to update, in the optical module driver, the port number corresponding to the optical module that is recovered to normal, and synchronizing the update to the BMC.

Although the present disclosure is described in detail with reference to the drawings and in conjunction with preferred embodiments, the present disclosure is not limited thereto. Those of ordinary skill in the art may make various equivalent modifications or substitutions to the embodiments of the present disclosure without departing from the spirit and essence of the present disclosure, and such modifications or substitutions fall within the scope of the present disclosure, or variations or substitutions readily conceivable by any person who is familiar with this technical field within the technical scope of the present disclosure shall fall within the protection scope of the present disclosure. Therefore, the protection scope of the present disclosure shall be subject to the protection scope of the claims.

What is claimed is:

1. An Inter-Integrated Circuit (I2C) deadlock and recovery method, comprising following steps:

S1, providing an optical module reading unit and an optical module isolation unit in a central processing unit (CPU) of a switch;

S2, configuring the optical module reading unit to periodically scan states of each optical module in the switch, reading contents of in-place optical modules, and determining whether there is a faulty optical module in which a content reading failure occurs but a state of which is in place; and S3, configuring the optical module isolation unit to isolate all optical modules of the switch, resetting an I2C bus, searching for and blocking the faulty optical module, deactivating an isolation of normal optical modules in the switch after the faulty optical module is blocked off, and notifying a Baseboard Management Controller (BMC) before and after the isolation of the optical modules, wherein substeps of step S3 comprise:

S31, configuring the optical module isolation unit to mark all the optical modules as unreadable in an optical module driver to isolate all the optical modules;

S32, configuring the optical module isolation unit to notify the BMC that there is an abnormal optical module, and resetting an I2C data selector;

S33, configuring the optical module isolation unit to iteratively read all ports of the switch, locating a reading failure port, and determining and recording damage of an optical module corresponding to the reading failure port; and S34, configuring the optical module isolation unit to mark a faulty port number in the optical module driver, deactivating the isolation of the normal optical modules, and synchronously notifying the BMC.

2. The I2C deadlock and recovery method according to claim 1, wherein substeps of step S2 are as follows:

S21, configuring the optical module reading unit to periodically scan the states of each optical module in the switch, and obtaining the in-place optical modules;

S22, configuring the optical module reading unit to read the contents of the in-place optical modules in sequence, and determining whether the content reading failure occurs;

when the content reading failure occurs, entering step S23;

when the content reading failure does not occur, returning to step S21; and

S23, configuring the optical module reading unit to determine an existence of the faulty optical module, and entering step S3.

3. The I2C deadlock and recovery method according to claim 2, wherein the optical module reading unit is configured to read the contents of the in-place optical modules in an Electrically-Erasable Programmable Read-Only Memory (EEPROM) and a Digital Optical Monitoring (DOM).

4. The I2C deadlock and recovery method according to claim 1, wherein in the step S1, an optical module scanning in-place unit is further provided in the CPU of the switch; and the following step is further comprised after step S3:

S4, configuring the optical module scanning in-place unit to regularly detect whether the faulty optical module is recovered to normal, and deactivating the blocking of the faulty optical module after the faulty optical module is recovered to normal.

5. The I2C deadlock and recovery method according to claim 4, wherein substeps of step S4 are as follows:

S41, configuring the optical module scanning in-place unit to regularly detect whether the faulty optical module is recovered to normal; and when the faulty optical module is not recovered to normal, returning to step S41.

6. The I2C deadlock and recovery method according to claim 5, wherein substeps of step S4 are further as follows:

when the faulty optical module is recovered to normal, S42 configuring the optical module scanning in-place unit to update, in the optical module driver, a port number corresponding to the faulty optical module that is recovered to normal, and synchronizing the update to the BMC.

7. An Inter-Integrated Circuit (I2C) deadlock and recovery device, comprising:

a memory, configured to store computer instructions; and a processor, configured to execute the computer instructions, and upon execution of the computer instructions, is configured to:

S1, provide an optical module reading unit and an optical module isolation unit in a central processing unit (CPU) of a switch;

S2, configure the optical module reading unit to periodically scan states of each optical module in the switch, read contents of in-place optical modules, and determine whether there is a faulty optical module in which a content reading failure occurs but a state of which is in place; and S3, configure the optical module isolation unit to isolate all optical modules of the switch, reset an I2C bus, search for and block the faulty optical module, deactivate an isolation of normal optical modules in the switch after the faulty optical module is blocked off, and notify a Baseboard Management Controller (BMC) before and after the isolation of the optical modules, wherein the processor, upon execution of the computer instructions, is further configured to:

S31, configure the optical module isolation unit to mark all the optical modules as unreadable in an optical module driver to isolate all the optical modules;

S32, configure the optical module isolation unit to notify the BMC that there is an abnormal optical module, and reset an I2C data selector;

S33, configure the optical module isolation unit to iteratively read all ports of the switch, locate a reading failure port, and determine and record damage of an optical module corresponding to the reading failure port; and S34, configure the optical module isolation unit to mark a faulty port number in the optical module driver, deactivate the isolation of the normal optical modules, and synchronously notify the BMC.

8. The I2C deadlock and recovery device according to claim 7, wherein the processor, upon execution of the computer instructions, is further configured to:

S21, configure the optical module reading unit to periodically scan the states of each optical module in the switch, and obtain the in-place optical modules;

S22, configure the optical module reading unit to read the contents of the in-place optical modules in sequence, and determine whether the content reading failure occurs;

when the content reading failure occurs, enter step S23;

when the content reading failure does not occur, return to step S21; and

S23, configure the optical module reading unit to determine an existence of the faulty optical module, and enter step S3.

9. The I2C deadlock and recovery device according to claim 8, wherein the optical module reading unit is configured to read the contents of the in-place optical modules in an Electrically-Erasable Programmable Read-Only Memory (EEPROM) and a Digital Optical Monitoring (DOM).

10. The I2C deadlock and recovery device according to claim 7, wherein:

an optical module scanning in-place unit is further provided in the CPU of the switch; and the processor, upon execution of the computer instructions, is further configured to:

after step S3, S4, configure the optical module scanning in-place unit to regularly detect whether the faulty optical module is recovered to normal, and deactivate the blocking of the faulty optical module after the faulty optical module is recovered to normal.

11. The I2C deadlock and recovery device according to claim 10, wherein the processor, upon execution of the computer instructions, is further configured to:

S41, configure the optical module scanning in-place unit to regularly detect whether the faulty optical module is recovered to normal; and when the faulty optical module is not recovered to normal, return to step S41.

12. The I2C deadlock and recovery device according to claim 11, wherein the processor, upon execution of the computer instructions, is further configured to:

when the faulty optical module is recovered to normal, S42 configure the optical module scanning in-place unit to update, in the optical module driver, a port number corresponding to the faulty optical module that is recovered to normal, and synchronize the update to the BMC.

13. A non-transitory computer-readable storage medium, storing a computer program that is executable by a processor, and upon execution by the processor, is configured to cause the processor to:

S1, provide an optical module reading unit and an optical module isolation unit in a central processing unit (CPU) of a switch;

S2, configure the optical module reading unit to periodically scan states of each optical module in the switch, read contents of in-place optical modules, and determine whether there is a faulty optical module in which a content reading failure occurs but a state of which is in place; and S3, configure the optical module isolation unit to isolate all optical modules of the switch, reset an I2C bus, search for and block the faulty optical module, deactivate an isolation of normal optical modules in the switch after the faulty optical module is blocked off, and notify a Baseboard Management Controller (BMC) before and after the isolation of the optical modules, wherein the computer program, upon execution by the processor, is further configured to cause the processor to:

S31, configure the optical module isolation unit to mark all the optical modules as unreadable in an optical module driver to isolate all the optical modules;

S32, configure the optical module isolation unit to notify the BMC that there is an abnormal optical module, and reset an I2C data selector;

S33, configure the optical module isolation unit to iteratively read all ports of the switch, locate a reading failure port, and determine and record damage of an optical module corresponding to the reading failure port; and S34, configure the optical module isolation unit to mark a faulty port number in the optical module driver, deactivate the isolation of the normal optical modules, and synchronously notify the BMC.

14. The non-transitory computer-readable storage medium according to claim 13, wherein the computer program, upon execution by the processor, is further configured to cause the processor to:

S21, configure the optical module reading unit to periodically scan the states of each optical module in the switch, and obtain the in-place optical modules;

S22, configure the optical module reading unit to read the contents of the in-place optical modules in sequence, and determine whether the content reading failure occurs;

when the content reading failure occurs, enter step S23;

when the content reading failure does not occur, return to step S21; and

S23, configure the optical module reading unit to determine an existence of the faulty optical module, and enter step S3.

15. The non-transitory computer-readable storage medium according to claim 14, wherein the optical module reading unit is configured to read the contents of the in-place optical modules in an Electrically-Erasable Programmable Read-Only Memory (EEPROM) and a Digital Optical Monitoring (DOM).

16. The non-transitory computer-readable storage medium according to claim 13, wherein:

an optical module scanning in-place unit is further provided in the CPU of the switch; and the computer program, upon execution by the processor, is further configured to cause the processor to:

after step S3, S4, configure the optical module scanning in-place unit to regularly detect whether the faulty optical module is recovered to normal, and deactivate the blocking of the faulty optical module after the faulty optical module is recovered to normal.

17. The non-transitory computer-readable storage medium according to claim 16, wherein the computer program, upon execution by the processor, is further configured to cause the processor to:

S41, configure the optical module scanning in-place unit to regularly detect whether the faulty optical module is recovered to normal; and when the faulty optical module has not recovered to normal, return to step S41.

* * * * *